(12) United States Patent
Davis

(10) Patent No.: US 11,444,777 B2
(45) Date of Patent: Sep. 13, 2022

(54) METHOD AND SYSTEM FOR PROVIDING VALIDATED, AUDITABLE, AND IMMUTABLE INPUTS TO A SMART CONTRACT

(71) Applicant: MASTERCARD INTERNATIONAL INCORPORATED, Purchase, NY (US)

(72) Inventor: Steven Charles Davis, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 24 days.

(21) Appl. No.: 16/946,185

(22) Filed: Jun. 9, 2020

(65) Prior Publication Data

US 2020/0304312 A1 Sep. 24, 2020

Related U.S. Application Data

(63) Continuation of application No. 15/392,108, filed on Dec. 28, 2016, now Pat. No. 10,715,331.

(51) Int. Cl.
*H04L 9/32* (2006.01)
*G06F 16/951* (2019.01)
(Continued)

(52) U.S. Cl.
CPC .......... *H04L 9/3239* (2013.01); *G06F 16/951* (2019.01); *G06F 21/64* (2013.01);
(Continued)

(58) Field of Classification Search
USPC ....................................... 713/168
See application file for complete search history.

(56) References Cited

U.S. PATENT DOCUMENTS 10,521,780 B1 * 12/2019 Hopkins, III .......... G06Q 20/10
2012/0197868 A1 8/2012 Fauser et al.
(Continued)

FOREIGN PATENT DOCUMENTS

KR 10-2016-0095720 A 8/2016
WO 2017/145018 A1 8/2017
(Continued)

OTHER PUBLICATIONS

Antonopoulos, "Bitcoin and Blockchain," NTT Publishing Co., Ltd. (Jul. 21, 2016), First edition, pp. 31-65.
(Continued)

*Primary Examiner* — Sakinah White Taylor
(74) *Attorney, Agent, or Firm* — Panitch Schwarze Belisario & Nadel LLP

(57) ABSTRACT

A method for posting of auditable, immutable data to a blockchain includes: receiving a blockchain including a plurality of blocks, each block including at least a block header and one or more transaction values, wherein each transaction value includes at least a transaction hash; receiving a data file associated with a specific transaction hash included in a block in the blockchain, wherein the data file includes one or more variables; modifying at least one of the one or more variables included in the data file; generating a new hash value via application of one or more hashing algorithms to the modified data file; generating a new transaction value based on at least the generated new hash value and the specific transaction hash; digitally signing the generated new transaction value; and electronically transmitting the signed new transaction value.

20 Claims, 6 Drawing Sheets

(51) Int. Cl.
  *G06Q 20/38* (2012.01)
  *G06F 21/64* (2013.01)
  *G06Q 20/06* (2012.01)
  *G06Q 20/36* (2012.01)

(52) U.S. Cl.
  CPC ........... *G06Q 20/065* (2013.01); *G06Q 20/36* (2013.01); *G06Q 20/3678* (2013.01); *G06Q 20/388* (2013.01); *G06Q 20/3825* (2013.01); *G06Q 20/3827* (2013.01); *G06Q 20/38215* (2013.01); *H04L 9/3247* (2013.01); *G06F 21/645* (2013.01); *G06Q 2220/00* (2013.01)

(56) References Cited

U.S. PATENT DOCUMENTS

| | | | |
|---|---|---|---|
| 2012/0271660 A1* | 10/2012 | Harris | G06Q 20/12 705/4 |
| 2016/0342977 A1 | 11/2016 | Lam | |
| 2017/0017954 A1* | 1/2017 | McDonough | H04L 9/3239 |
| 2017/0046689 A1* | 2/2017 | Lohe | G06Q 20/40 |
| 2017/0134280 A1 | 5/2017 | Davis | |
| 2017/0134937 A1* | 5/2017 | Miller | H04L 9/0637 |
| 2017/0221052 A1* | 8/2017 | Sheng | G06Q 20/3829 |
| 2017/0236121 A1 | 8/2017 | Lyons et al. | |
| 2017/0346693 A1 | 11/2017 | Dix et al. | |
| 2018/0068091 A1* | 3/2018 | Gaidar | G06F 21/10 |
| 2018/0109516 A1 | 4/2018 | Song et al. | |
| 2018/0130034 A1* | 5/2018 | Taylor | H04L 9/3247 |
| 2018/0183587 A1 | 6/2018 | Won et al. | |
| 2018/0276666 A1 | 9/2018 | Haldenby et al. | |
| 2019/0081796 A1 | 3/2019 | Chow et al. | |
| 2019/0116142 A1 | 4/2019 | Chalakudi et al. | |

FOREIGN PATENT DOCUMENTS

| | | |
|---|---|---|
| WO | 2017145019 A1 | 8/2017 |
| WO | 2018/111295 A1 | 6/2018 |

OTHER PUBLICATIONS

Office Action (Notification of Reasons for Refusal) dated Nov. 10, 2020, by the Japanese Patent Office in corresponding Japanese Patent Application No. 2019-535304 and an English Translation of the Office Action. (8 pages).

Office Action (First Examination Report) dated Sep. 30, 2020, by the Intellectual Property India in corresponding India Patent Application No. 201817007053 with an English Translation of the Office Action. (8 pages).

Antonopoulos, Mastering Bitcoin—Unlockng Cryptocurrencies, O'Reilly Media Inc., (Publication date Dec. 20, 2014, pp. 50-60.

Office Action (Communication pursuant to Article 94(3) EPC) dated Feb. 16, 2021, by the European Patent Office in corresponding European Patent Application No. 17 795 165.4-1213. (6 pages).

Antonopoulos, "Mastering Bitcoin-Unlocking Digital Cryptocurrencies", Mastering Bitcoin: [unlocking digital crytocurrencies], O'Reilly Media, XP055306939, ISBN: 978-1-4493-7404-4, 298 pages.

International Search Report and the Written Opinion dated Dec. 20, 2017 in corresponding PCT Application PCT/US2017/058440.

IBM Building the block chain ecosystem (Dec. 9, 2016), with English translation, <http://www.ciokorea.com/news/32299> (7 pages).

[Lee DeoRi cellar] The concept and application (Nov. 9, 2016) < of the smart CONT rack (Smart Contract) http://blog naver.com./mage 7th/220857350765. (19 pages).

Office Action (Notification of Reasons for Refusal) dated Jul. 17, 2020, by the Korean Intellectual Property Office in corresponding Korean Patent Application No. 10-2019-7018787 and an English Translation of the Office Action. (9 pages).

* cited by examiner

METHOD AND SYSTEM FOR PROVIDING VALIDATED, AUDITABLE, AND IMMUTABLE INPUTS TO A SMART CONTRACT

FIELD

The present disclosure relates to the posting of immutable data to a blockchain comprised of inputs for which the result of input into a smart contract is deterministic, enabling the validation and auditing of performance of the associated transaction.

BACKGROUND

As technology advances and becomes more sophisticated, businesses, individuals and other entities often look for ways to improve how they do business and communicate with one another. One element in which computing technology has drastically changed the landscape is the conducting of transactions between two entities. Transactions can occur between two entities for any variety of reasons: payment to or from, the purchase of goods or services, exchange of data, acquisition of property, consideration for a contract, etc. In many cases, computing technology may provide a platform for which an entity may prove or verify a transaction and data associated therewith, as well as perform communications related thereto. For instance, sending money via a computing device can be performed significantly quicker than physical delivery.

However, computing devices and electronic communications can sometimes be compromised, placing entities and their property at risk. A number of methods have been developed to help secure such communications, such as secure communication channels and protocols and encryption for data messages. Similarly, methods have been developed to secure the storage of data. One such method is the use of a blockchain, where the chain is decentralized and where data stored therein is immutable, providing for reliable proof of data at a specific time, such as agreement of specific contract terms.

However, while blockchains may be useful for validating an agreement or other data related to the planning or initiation of a transaction, blockchains currently lack capabilities for validating and auditing the performance of such a transaction. That is, there is a technical challenge as to how using blockchains for this purpose can be done. Thus, there is a need for a technical solution to provide for the auditing and validation of the performance of actions associated with a transaction using the blockchain.

SUMMARY

The present disclosure provides a description of systems and methods for the posting of auditable, immutable data to a blockchain and the auditing and verification thereof. The inputs to a smart contract are stored in a blockchain and immutable, and are such that the output of the smart contract is deterministic based on the nature of the smart contract and associated inputs. As a result, an entity wishing to verify performance related to a smart contract may be able to generate the expected output for use in auditing and verifying the performance. Furthermore, by posting the data associated with such performance to the blockchain, further performance may also be audited and verifiable, enabling the accurate capturing, auditing, and validation of the entire performance of a transaction between two or more entities.

A method for posting of auditable, immutable data to a blockchain includes: receiving, by a receiving device of a processing server, a blockchain comprised of a plurality of blocks, each block being comprised of at least a block header and one or more transaction values, wherein each transaction value includes at least a transaction hash; receiving, by the receiving device of the processing server, a data file associated with a specific transaction hash included in a block in the blockchain, wherein the data file includes one or more variables; modifying, by a data modification module of the processing server, at least one of the one or more variables included in the data file; generating, by a hashing module of the processing server, a new hash value via application of one or more hashing algorithms to the modified data file; generating, by a generation module of the processing server, a new transaction value based on at least the generated new hash value and the specific transaction hash; digitally signing, by a signing module of the processing server, the generated new transaction value; and electronically transmitting, by a transmitting device of the processing server, the signed new transaction value.

A method for auditing and verification of deterministic data posted to a blockchain includes: receiving, by a receiving device of a processing server, a blockchain comprised of a plurality of blocks, each block being comprised of at least a block header and one or more transaction values, wherein each block header includes at least a timestamp and each transaction value includes at least a transaction hash; executing, by a querying module of the processing server, a first query on the blockchain to identify a first transaction value, wherein the first transaction value is associated with an executable script; executing, by a processor of the processing server, the executable script using a plurality of predetermined input values to receive at least one output variable; generating, by a hashing module of the processing server, a hash value based on at least the plurality of predetermined input values and the at least one output variable; generating, by a generation module of the processing server, a new transaction value based on at least the generated hash value and the transaction hash included in the first transaction value; and verifying, by a verification module of the processing server, a second transaction value included in a block in the blockchain where the second transaction value corresponds to the generated new transaction value.

A system for posting of auditable, immutable data to a blockchain includes: a receiving device of a processing server configured to receive a blockchain comprised of a plurality of blocks, each block being comprised of at least a block header and one or more transaction values, wherein each transaction value includes at least a transaction hash, and a data file associated with a specific transaction hash included in a block in the blockchain, wherein the data file includes one or more variables; a data modification module of the processing server configured to modify at least one of the one or more variables included in the data file; a hashing module of the processing server configured to generate a new hash value via application of one or more hashing algorithms to the modified data file; a generation module of the processing server configured to generate a new transaction value based on at least the generated new hash value and the specific transaction hash; a signing module of the processing server configured to digitally sign the generated new transaction value; and a transmitting device of the processing server configured to electronically transmit the signed new transaction value.

A system for auditing and verification of deterministic data posted to a blockchain includes: a receiving device of a processing server configured to receive a blockchain comprised of a plurality of blocks, each block being comprised of at least a block header and one or more transaction values, wherein each block header includes at least a timestamp and each transaction value includes at least a transaction hash; a querying module of the processing server configured to execute a first query on the blockchain to identify a first transaction value, wherein the first transaction value is associated with an executable script; a processor of the processing server configured to execute the executable script using a plurality of predetermined input values to receive at least one output variable; a hashing module of the processing server configured to generate a hash value based on at least the plurality of predetermined input values and the at least one output variable; a generation module of the processing server configured to generate a new transaction value based on at least the generated hash value and the transaction hash included in the first transaction value; and a verification module of the processing server configured to verify a second transaction value included in a block in the blockchain where the second transaction value corresponds to the generated new transaction value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
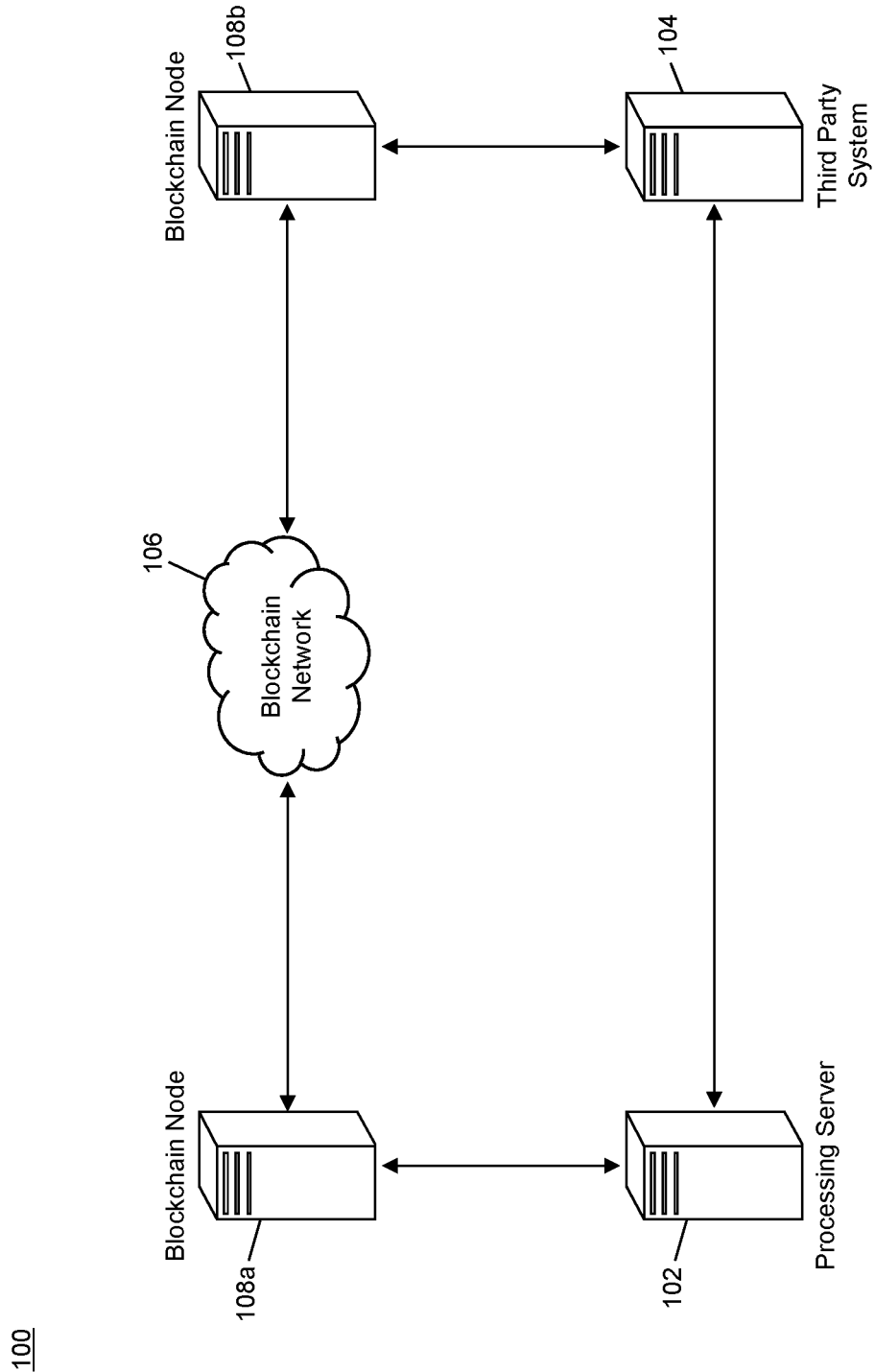
FIG. 1 is a block diagram illustrating a high level system architecture for the posting of immutable data related to a transaction to a blockchain and the auditing and verification thereof in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Smart Contract—Computer protocols that facilitate, verify, or enforce the negotiation or performance of a transaction. A smart contract may be formatted as an executable script or other type of computing function such that, when the contract is executed by a suitable processor, one or more predetermined actions are performed. In many instances, a smart contract may emulate the clauses of a traditional contract, such as by being configured to perform the actions associated with positive performance or negative performance (e.g., breach) of the terms of the smart contract. For instance, a smart contract may be associated with a deal for the purchase of widgets, where the smart contract is configured to (i) initiate payment to the supplier if the buyer receives the widgets, or (ii) notify the buyer if the supplier has not supplied the widgets by a predetermined date.

System for Auditing and Validation for Immutable Smart Contract Inputs

FIG. 1 illustrates a system 100 for the storing of immutable inputs to a smart contract in a blockchain, and the auditing and verification of performance associated therewith based on a deterministic output of the smart contract.

The system 100 may include a processing server 102. The processing server 102, discussed in more detail below, may be specifically configured to perform actions discussed herein related to the generation of data for posting to a blockchain and the auditing and verification thereof, making it a special purpose computer when programmed to carry out these functions. The processing server 102 may be a computing system or part of a computing system for an entity that is configured for participation in an electronic transaction between the entity and another entity. For instance, the processing server 102 may exchange electronic communications with a third party system 104 for a second entity also participating in an electronic transaction. As discussed herein, each of the functions performed by the processing server 102 and the third party system 104 may also be performed by the corresponding computing device(s).

The system 100 may also include a blockchain network 106, which may be associated with a blockchain to which data discussed herein may be posted. The blockchain network 106 may be comprised of a plurality of blockchain nodes 108, such as the blockchain nodes 108a and 108b illustrated in FIG. 1. Although only two are shown in the illustration for clarity, it is contemplated many more, dozens, hundreds or even thousands, or even more might be used. The blockchain nodes 108 may be configured to generate and verify new blocks for addition to the blockchain using methods and systems that will be apparent to persons having skill in the relevant art. In some embodiments, the processing server 102 and/or third party system 104 may be configured to operate as a blockchain node 108 for the blockchain network 106. For instance, the processing server 102 may be configured to, in addition to the functions discussed herein, generate new blocks, verify blocks, and add the new, verified blocks to the blockchain.

The entity associated with the processing server 102 (also referred to herein as a "first entity") may communicate with the entity associated with the third party system 104 (also referred to herein as a "second entity") regarding a proposed electronic transaction. In some embodiments, additional entities may be involved in a transaction. In such embodiments, the additional entities may be associated with third party systems 104 where the functions performed thereby may be the same functions performed by the third party system 104 as discussed herein. The proposed electronic transaction may be any transaction where at least one of the involved entities is expected to perform an action, whose performance may be verified by the other entity. Electronic transactions may include, for example, a purchase of goods or services, exchange of data, performance contract, etc. For instance, in an example, the transaction may be a service contract where the first entity may agree to pay a $1,000 down payment for the renovation of an office, the second entity may agree to renovate the office by a predetermined time, and the first entity may pay $9,000 once the work is completed.

The first entity and the second entity may agree on the terms associated with the transaction, which may be referred to herein as "inputs." For instance, in the above example, the inputs may include the $1,000 down payment, a due date for the down payment, due date for performance of the renovation, the $9,000 final payment, and a due date for the final payment. The processing server 102 and/or third party system 104 may be configured to electronically transmit the agreed inputs to a blockchain node 108 as a transaction value for a transaction to be added to the blockchain associated therewith. The transaction value may, as discussed in more detail below, be a hash value indicative of the transaction inputs. As a result, the agreed-upon inputs may be stored in the blockchain and immutable due to the nature of the blockchain, where hash values stored in headers of the blocks of the blockchain may ensure immutability of the data stored therein. In some embodiments, the blockchain may be used to store immutable data associated with both the inputs and agreement of the inputs by one or both entities. For instance, the first entity and/or second entity may use acceptance frames that are included in transaction hashes to indicate acceptance of the terms. Additional information regarding acceptance frames can be found in U.S. patent application Ser. No. 14/938,213, entitled "Method and System for Validation of Hashed Data via Acceptance Frames," by Steven C. Davis, which is herein incorporated by reference in its entirety.

The transaction value for the transaction between the first and second entities may be comprised of each of the inputs, or in some instances, may include a single transaction hash indicative of the inputs. For instance, the transaction hash may be generated via the application of one or more hashing algorithms to the inputs, such as by combining the inputs in a predetermined manner (e.g., combining each input into a single string, using a divider, storing the inputs in a data file, etc.), or by generating a Merkle tree of the inputs and using the root of the Merkle tree. In instances where a hash value may be generated, the processing server 102 may be configured to store a key-value pair in a key-value database, discussed in more detail below, where the hash value may be a key in a key-value pair, with the corresponding value being the inputs used in generation of the key. In such instances, the third party system 104 may generate the transaction hash using the same hashing algorithm(s) and data formatting for its own key-value pair, which may thereby be used to verify that the transaction hash posted to the blockchain is accurate as to the agreed-upon inputs.

Once the transaction has been posted to the blockchain, the involved entities may update the blockchain once any performance is executed for the transaction, such that the other entity or entities involved in the transaction can monitor the blockchain to identify when such performance has occurred and to verify the performance. In an exemplary embodiment, a smart contract may be used to perform actions related to the performance of the transaction between the first and second entities. For example, the smart contract may be configured to generate the updates for the blockchain transactions, send messages to the entity whose performance is next once one action has been completed, invalidate the transaction and initiate any actions for non-performance, etc. For instance, in the above example, if the first entity does not pay the down payment of $1,000 by the due date, the smart contract may execute (e.g., after the due date if the blockchain has not been updated to indicate the payment) to inform the second entity of the non-payment and to refund any payments made by the first entity if the $1,000 total was not reached.

In such embodiments, the transaction value may include the smart contract or a reference thereto, or the smart contract or associated reference may be used in the generation of the transaction hash that comprises the transaction value. The reference may be, for instance, a hash value for the smart contract itself, such as may be generated via hashing of the smart contract and/or as the key in a key-value pair that includes the smart contract as a value. In some cases, one smart contract may be used for a plurality of different transactions, where each transaction value may include or incorporate the associated reference. In such cases, the smart contract may be executed using the transaction inputs as input, to perform the programmed functions accordingly. For instance, the smart contract may be used for a plurality of service transactions, where, as in the above example, the smart contract may receive the $1,000 and due date of the down payment as input, where execution of the smart contract (e.g., by the processing server 102 or blockchain node 108) checks for payment of the specified $1,000 down payment by the specified due date.

The first entity (e.g., or any involved entity that is next to perform based on the transaction) may be perform the required action as part of the transaction. For instance, in the above example, the first entity may pay the $1,000 prior to the due date for the down payment. The processing server 102 may generate a new transaction value for the transaction following performance of the action. The new transaction may include modified inputs for the transaction based on the performance. For instance, the inputs may include an additional input that serves as proof of the down payment (e.g., a confirmation number for the transaction, a receipt for the transaction, etc.), which may also be provided by the smart contract. For example, the smart contract may verify the payment using any suitable method and may output a reference number for inclusion in the transaction value (e.g., or transaction hash included therein, as applicable).

Once the transaction value has been generated, the processing server 102 may digitally sign the new transaction value using a suitable method. For instance, the processing server 102 may possess a private key of a key pair, which may be used in digitally signing the new transaction value via a suitable signing algorithm, which may be known to the third party system 104. In such an instance, the third party system 104 may be provided with a copy of the corresponding public key from the key pair. The processing server 102 may electronically transmit the digitally signed new transaction value to a blockchain node 108 for posting to the blockchain.

Once the updated transaction hits the blockchain, the third party system 104 may be configured to retrieve the transaction value to verify that the processing server 102 had performed its action as part of the transaction. In instances where the transaction value is digitally signed, verification may include verification of the digital signature, such as using the public key supplied to the third party system 104 from the processing server 102. Verification may also include verification that the transaction value is an expected value.

In an exemplary embodiment, the smart contract may be a deterministic contract, such that the output from the smart contract upon the performance of an action can be determined ahead of the performance of the action. For instance, in the above example, it is predetermined that the first entity will either pay the $1,000 by the specific due date, or breach. In such embodiments, the inputs may be referred to herein as "deterministic inputs," such that outputs from the smart contract may be determined accordingly. In these embodiments, the third party system 104 may be configured to generate an estimated new transaction value based on knowledge of the deterministic inputs for the transaction and the expected action to be performed by the first entity. For instance, in the above example, the third party system 104 may generate the estimated new transaction value using the output from the smart contract being fed with the deterministic inputs used in the original transaction value if the $1,000 down payment is paid by the due date.

The third party system 104 may use the estimated new transaction value to verify and audit the first entity's performance, by comparing the transaction value retrieved from the blockchain with the expected, estimated transaction value. As such, an entity involved in a transaction may be configured to verify that the other entity or entities in the transaction are performing their functions as required. The use of the blockchain to store the transaction values may also ensure that the proof of actions being performed is immutable, to prevent collusion or fraud on the part of entities involved in the transaction, and also to serve as an auditable, and easily accessible, record of the full performance of a transaction. As, in standard implementations, each block added to the blockchain is time stamped, the transaction values thus reflect the terms of the transaction, any actions performed, and when such actions were performed, to provide enough data suitable for auditing the performance.

In some embodiments, the processing server 102 may be configured to use templates for the generation and/or storage of inputs for a transaction. Templates may be used to specify the data fields that may be necessary for the use of a specific smart contract, to ensure accurate processing and data consistency. For instance, in the above example, a template may specify the criteria that needs to be provided (e.g., the three due dates and two payment amounts), how such data needs to be formatted, and other data regarding the inputs for the transaction. In some cases, the template may be used to generate a data file that serves as a transaction value or is hashed to generate the transaction value for the transaction. In other cases, the template may be referred to by or in the transaction value. For example, the template may have a reference identifier associated therewith (e.g., a hash value of the template, a key in a key-value pair with the template comprising the value, etc.), which may be included in the transaction value, such as being a transaction input or used in the generation of a transaction hash.

The first entity, second entity, and any other entity involved in the transaction may continue to perform actions as set forth in the transaction, where the blockchain is updated accordingly by each entity with the transaction values being digitally signed by the respective entity. The continued updating of the blockchain may ensure that performance of the transaction is auditable every step of the way, with the immutability of the blockchain providing that the auditing and verifying of the performance is accurate and protected from fraud. The use of smart contracts with deterministic inputs may ensure that fraud cannot be performed, that the results of actions may be predicted for faster and more accurate verifications, and that no entity can tamper with the history of a transaction to cover for any fraudulent activity. As a result, the methods and systems discussed herein provide for a technological solution that provides greater accuracy, efficiency, and confidence than traditional systems.

Processing Server

Figure 2:
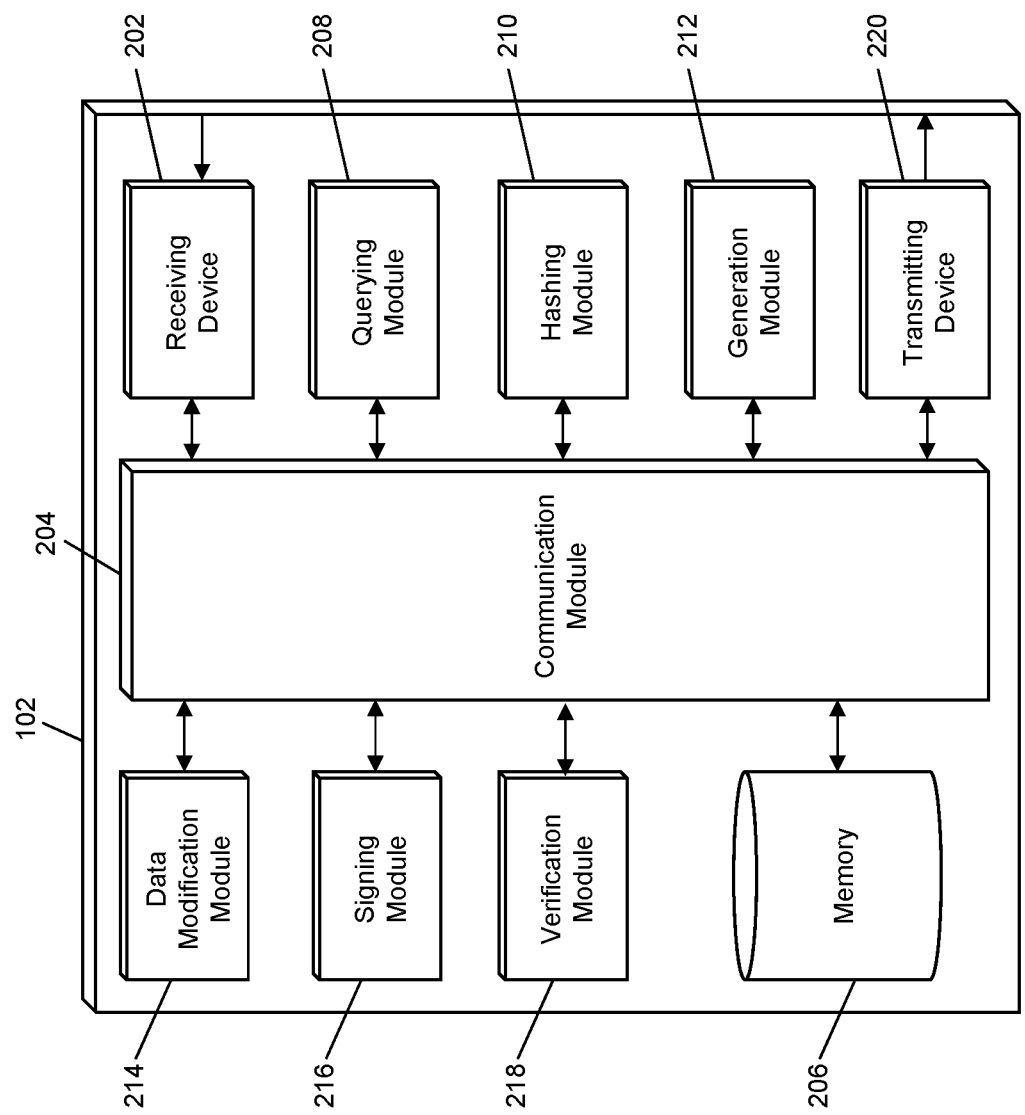
FIG. 2 is a block diagram illustrating the processing server of the system of FIG. 1 for the posting, auditing, and verification of transaction data in a blockchain utilizing immutable inputs to a smart contract in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102. In some embodiments, the third party system 104 in the system 100 as illustrated in FIG. 1 and discussed herein may be implemented using the components of the processing server 102 as illustrated in FIG. 2 and discussed below.

The processing server 102 may include a receiving device 202. The receiving device 202 may be configured to receive data over one or more networks via one or more network protocols. In some instances, the receiving device 202 may be configured to receive data from third party systems 104, blockchain networks 106, blockchain nodes 108, and other systems and entities via one or more communication methods, such as near field communication, BLUETOOTH, the Internet, local area networks, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by blockchain networks 106 and/or blockchain nodes 108 associated therewith that may be superimposed or otherwise encoded with blockchain data. The blockchain may be comprised of a plurality of blocks, each block being comprised of at least a block header and one or more transaction values. A block header may include at least a timestamp and a reference to a prior block in the blockchain. In some embodiments, the reference may be a hash of the block header of the prior block. In some cases, a block header may also include a Merkle root of a Merkle tree generated for the transaction values included in the block. In the methods and systems discussed herein, the one or more transaction values may each be comprised of a transaction hash, which may be a hash of at least the inputs for the related transaction. The receiving device 202 may also be configured to receive data signals electronically transmitted by third party systems 104, such as may be superimposed or otherwise encoded with deterministic inputs or data associated therewith, such as a template reference, smart contract reference, performance data, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art, such as a processor configured to execute smart contracts, such as via the execution of executable scripts associated therewith. In some embodiments, the processing device may include and/or be comprised of a plurality of engines and/or modules specially configured to perform one or more functions of the processing device, such as a querying module 208, hashing module 210, generation module 212, data modification module 214, signing module 216, verification module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 206. The memory 206 may be configured to store data for use by the processing server 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store the blockchain, such as may be received from the blockchain network 106, as discussed above. The memory 206 may also be configured to store a key-value database, which may be comprised of a plurality of key-value pairs. In such instances, key-value pairs may include pairs where a hash value is used as a key, with the data used to generate the hash value being the corresponding value, which may be used to store deterministic inputs, data templates, smart contracts, and other data for use in performing the functions discussed herein. The memory 206 may also be configured to store private keys and public keys of key pairs, which may be configured for use in digitally signing transaction values and the verification of digital signatures.

The processing server 102 may include a querying module 208. The querying module 208 may be configured to execute queries on databases to identify and perform other actions related to information. The querying module 208 may receive one or more data values or query strings, and may execute a query string based thereon on an indicated database, such as the memory 206, to identify, modify, insert, update, etc. information stored therein. The querying module 208 may output identified information to an appropriate engine or module of the processing server 102 as necessary. The querying module 208 may, for example, execute a query on the memory 206 to identify a private key for use in digitally signing a transaction value, to add a new key-value pair for a new transaction being tracked using the blockchain, to identify a smart contract for execution for use in the verification of performance of a transaction, etc.

The processing server 102 may also include a hashing module 210. The hashing module 210 may be configured to hash data for the processing server 102 for the generation of hash values. The hashing module 210 may receive data to be hashed as input, may generate hash values via the application of one or more hashing algorithms thereto, and may output the resulting hash value to another module or engine of the processing server 102. In some embodiments, the input may include the one or more hashing algorithms or indications thereof. In other embodiments, the hashing module 210 may be configured to identify the hashing algorithm(s) (e.g., in the memory 206) to be used. The hashing module 210 may be configured, for example, to generate hash values of transaction values, templates, smart contracts, and other data via the application of one or more hashing algorithms thereto. In some instances, the generated hash values may be used for storage in the blockchain, serving as keys in key-value pairs stored in the memory 206, or for verification of performance based on blockchain data.

The processing server 102 may also include a generation module 212. The generation module 212 may be configured to generate data for use in performing the functions of the processing server 102 as discussed herein. The generation module 212 may receive instructions as input, which may be used to generate data, and the generated data output to one or more engines or modules of the processing server 102. In some instances, the instructions input to the generation module 212 may be accompanied by data for use therewith. For example, the generation module 212 may be configured to generate transaction values for transactions, such as based on deterministic inputs. In some instances, a transaction value may also be generated based on performance data. In some cases, the generation module 212 may be configured to generate key pairs for use in the digital signing of transaction values. In some embodiments, the generation module 212 may be configured to generate a data file, such as may include deterministic inputs using a predetermined format (e.g., detailed in a template), which may be hashed for use as a transaction value to be stored in the blockchain.

The processing server 102 may also include a data modification module 214. The data modification module 214 may be configured to modify data and/or data files for use in performing the functions of the processing server 102 as discussed herein. The data modification module 214 may receive instructions as input, which may be used to modify data stored in or received by the processing server 102, and the modified data output to one or more engines or modules of the processing server 102. For example, the data modification module 214 may be configured to modify a data file (e.g., storing deterministic inputs) to change one or more inputs, such as by removing an input, adding an input, changing the value of an input, etc., such as to reflect performance of a transaction or for estimation of the performance of a transaction.

The processing server 102 may also include a signing module 216. The signing module 216 may be configured to digitally sign data as part of the functions of the processing server 102 as discussed herein. The signing module 216 may receive data to be digitally signed as input, may digitally sign the data, and may output the digitally signed data, or at least the digital signature, to another module or engine of the processing server 102. The signing module 216 may be configured to digitally sign data via the use of a public key and one or more signing algorithms. In some embodiments, the input to the signing module 216 may include the private key and/or signing algorithms to be used in generating the digital signature. In other embodiments, the signing module 216 may be configured to identify (e.g., in the memory 206, such as via instructions submitted to the querying module 208) the private key and signing algorithm(s). In an example, the signing module 216 may be configured to digitally sign a transaction value generated via the deterministic inputs of a transaction, such as following performance by the associated entity.

The processing server 102 may also include a verification module 218. The verification module 218 may be configured to verify data for the processing server 102. The verification module 218 may receive data to be verified as input, may perform verification of the data, and may output a result (e.g., indicating positive or negative verification) of the verification to another module or engine of the processing server 102. For example, the verification module 218 may be configured to verify the digital signature on a transaction value (e.g., read from a block of the blockchain) using a public key (e.g., stored in the memory 206 and read therefrom), and to verify transaction values, such as by the comparison of an estimated transaction value (e.g., generated by the generation module 212) with a transaction value read from the blockchain.

The processing server 102 may also include a transmitting device 220. The transmitting device 220 may be configured to transmit data over one or more networks via one or more network protocols. In some instances, the transmitting device 220 may be configured to transmit data to third party systems 104, blockchain networks 106, blockchain nodes 108, and other entities via one or more communication methods, such as near field communication, BLUETOOTH, radio frequency, the Internet, local area networks, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 108 associated with a blockchain network 106 that may be superimposed or otherwise encoded with transaction values for posting to the blockchain. In some embodiments, the transmitting device 220 may be configured to electronically transmit data signals to third party systems 104, such as for the exchange of deterministic inputs, smart contract references, template references, public keys, or other data that may be exchanged for use in the performing the functions discussed herein.

Process for Posting Immutable, Auditable Data to the Blockchain

Figure 3:
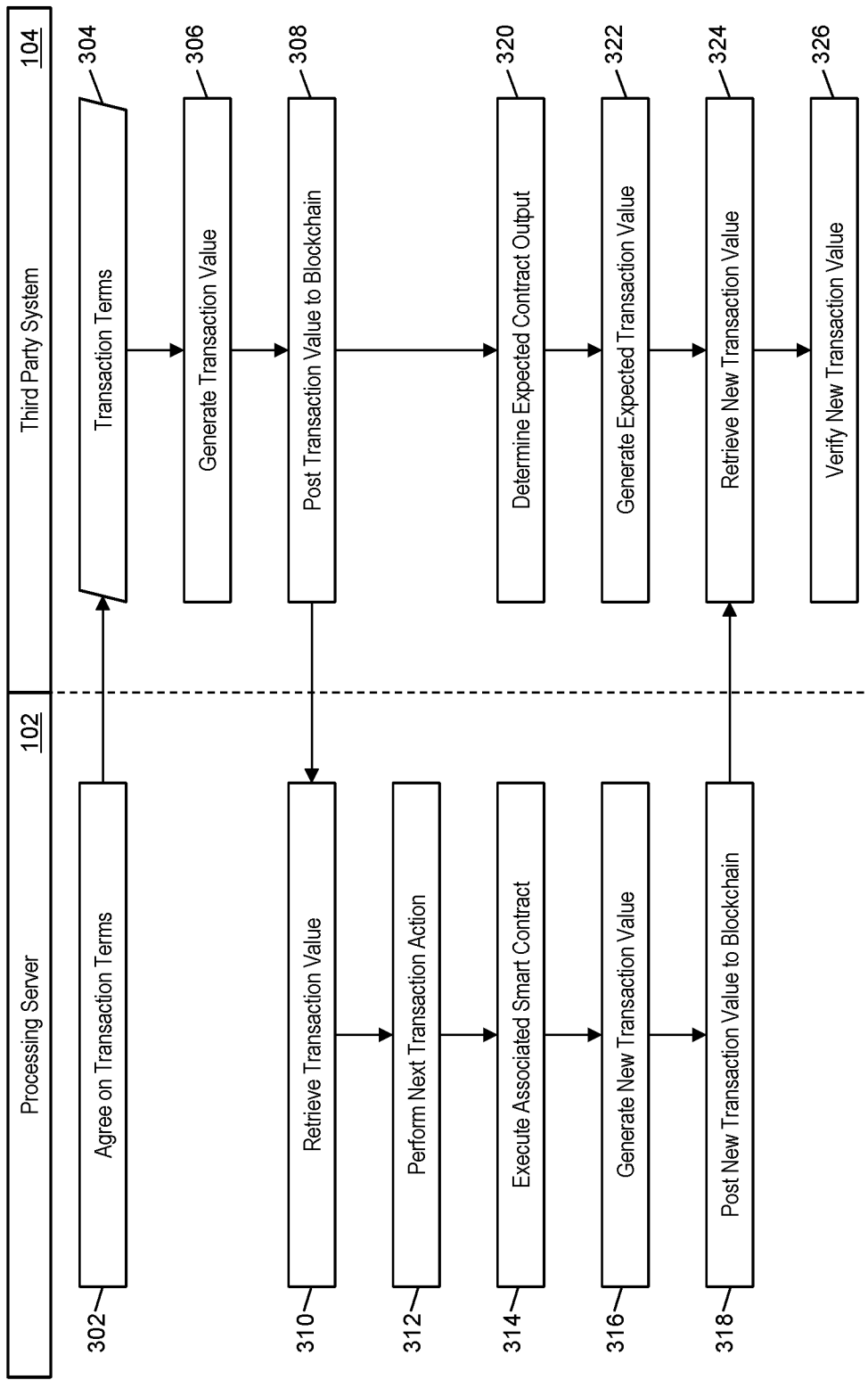
FIG. 3 is a flow diagram illustrating a process for the posting of data to a blockchain and the auditing and verification of performance related to a smart contract associated therewith in the system of FIG. 1 in accordance with exemplary embodiments.

FIG. 3 illustrates the posting of data related to the performance of a transaction to a blockchain in the system 100 where the data is immutable and also independently verifiable by third party systems 104 and other entities.

In step 302, the processing server 102 may (e.g., via the first entity associated therewith) agree on terms for a transaction with a second entity (e.g., via the third party system 104 associated therewith). The terms for the transaction may be used as deterministic inputs for the transaction. For instance, in the above example, the terms may include the down payment amount, full payment amount, due date for the down payment, due date for the service being purchased, and due date for the full payment. In an exemplary embodiment, each of the transaction terms may be deterministic. In step 304, the third party system 104 may receive (e.g., via a receiving device 202) the transaction terms that have been agreed upon. In some embodiments, the transaction terms may be received via the blockchain, such as through the use of acceptance frames.

In step 306, the third party system 104 may generate (e.g., via a hashing module 210 and/or generation module 212) a transaction value for the transaction based on at least the deterministic inputs. For instance, in one example, a data file may be generated that includes each of the deterministic inputs, which may be hashed to generate the transaction value. In some cases, the transaction value may also include (e.g., be based on) a reference to a smart contract and/or a template. In step 308, the third party system 104 may electronically transmit (e.g., via a transmitting device 220) the transaction value to a blockchain node 108 associated with the blockchain network 106 for inclusion in a block to be verified and posted to the blockchain.

In step 310, the receiving device 202 of the processing server 102 may retrieve the transaction value via the receipt of a newly added block in the blockchain that includes the transaction value therein. In step 312, the processing server 102 may (e.g., via the first entity associated therewith) perform the next action in the transaction. In the above example, the next action may be payment of the $1,000 down payment prior to the due date. As part of the performance of the action, in step 314, the processor of the processing server 102 may execute the smart contract associated with the transaction (e.g., identified via the reference included in the deterministic inputs). In some cases, the smart contract may be executed automatically by the blockchain network 106 upon satisfaction of the performance of the action (e.g., the smart contract may detect the payment of the $1,000 to the second entity). As part of the execution of the smart contract, the deterministic inputs for the transaction may be modified, such as by the changing of a flag, supplementing of a reference or confirmation number for the payment, etc.

In step 316, the hashing module 210 of the processing server 102 may generate a new transaction value for the transaction via the application of one or more hashing algorithms to the updated deterministic inputs for the transaction, which may reflect the performance of the action. In some instances, generation of the new transaction value may also include the digital signing (e.g., via the signing module 216 of the processing server 102) of the transaction value via the use of a private key associated with the first entity (e.g., and stored in the memory 206 of the processing server 102) and a suitable signing algorithm. In step 318, the transmitting device 220 of the processing server 102 may electronically transmit the newly-generated transaction value to a blockchain node 108 associated with the blockchain network 106 for inclusion in a block that is verified and posted to the blockchain.

In step 320, the third party system 104 may determine an expected output of the performance of the next action for the transaction by the first entity, such as by execution (e.g., of a processor thereof) of the associated smart contract using the deterministic inputs and estimation of the action by the first entity. In some cases, performance of step 320 may include modification to the deterministic inputs as performed by the processing server 102 in step 314. In step 322, the third party system 104 may generate (e.g., via a hashing module 210 and/or generation module 212) an expected transaction value for the transaction based on the expected output of the performance of the next action.

In step 324, the third party system 104 may (e.g., via a receiving device 202 thereof) retrieve the new transaction value that was posted to the blockchain. In some embodiments, steps 320 and 322 may be performed after, or concurrently with, step 324. In step 326, the third party system 104 may verify (e.g., via a verification module 218) the new transaction value by comparing it to the expected transaction value. In embodiments where the transaction value may be digitally signed, the verification may also include verification of the digital signature, which may be verified using a public key associated with the first entity. Verification of the transaction value may thus ensure that the next action of the transaction has been performed, with the transaction value on the blockchain being immutable proof of the action and suitable for use in auditing.

Exemplary Method for Posting of Auditable, Immutable Data to a Blockchain

Figure 4:
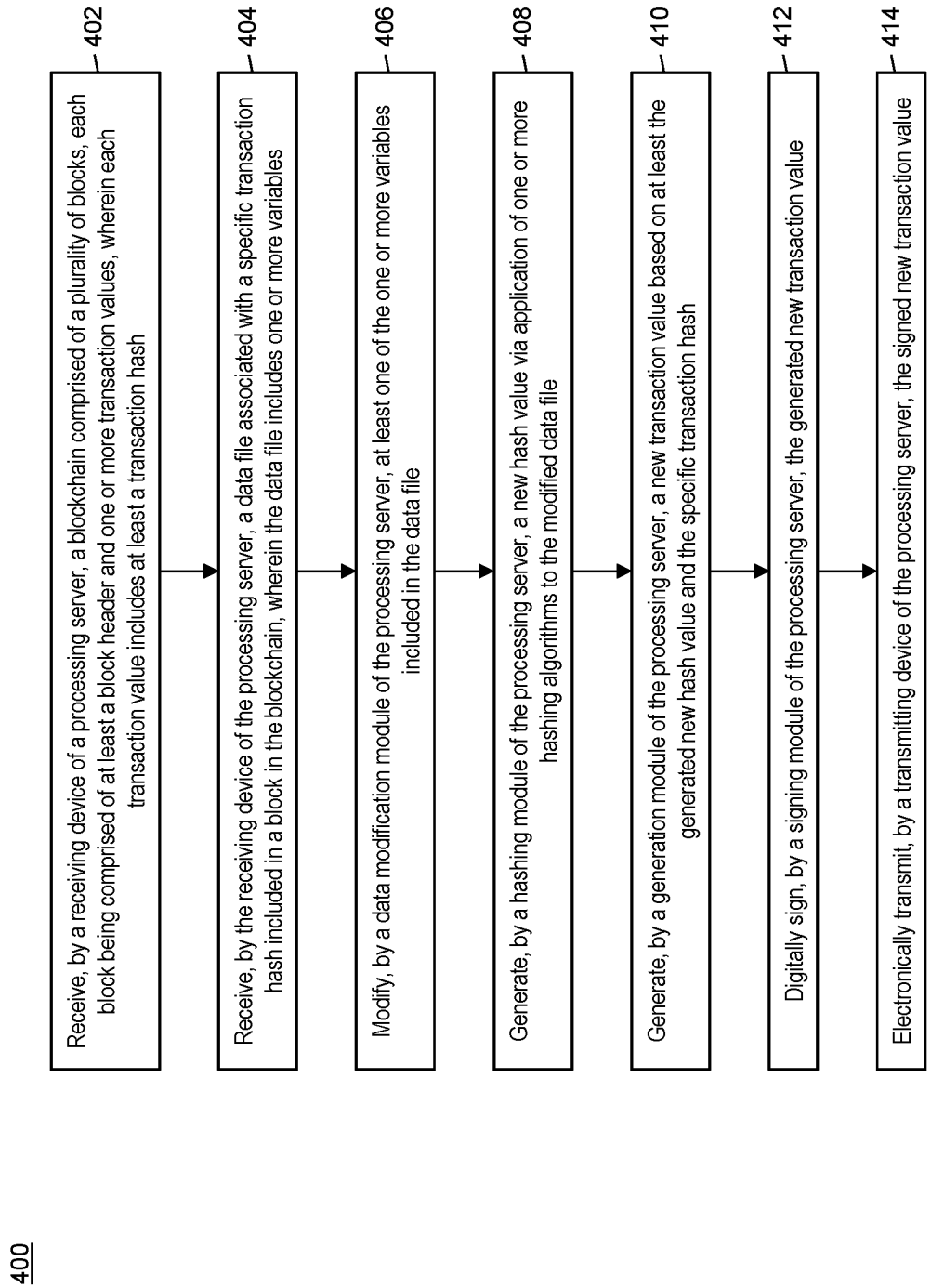
FIG. 4 is a flow chart illustrating an exemplary method for posting auditable, immutable data to a blockchain in accordance with exemplary embodiments.

FIG. 4 illustrates a method 400 for the posting of auditable and immutable data related to the performance of a transaction to a blockchain.

In step 402, a blockchain comprised of a plurality of blocks may be received by a receiving device (e.g., the receiving device 202) of a processing server (e.g., the processing server 102), each block being comprised of at least a block header and one or more transaction values, wherein each transaction value includes at least a transaction hash. In step 404, a data file associated with a specific transaction included in a block in the blockchain may be received by the receiving device of the processing server, wherein the data file includes one or more variables.

In step 406, at least one of the one or more variables included in the data file may be modified by a data modification module (e.g., the data modification module 214) of the processing server. In step 408, a new hash value may be generated by a hashing module (e.g., of the hashing module 210) of the processing server via application of one or more hashing algorithms to the modified data file.

In step 410, a new transaction value may be generated by a generation module (e.g., the generation module 212) of the processing server based on at least the generated new hash value and the specific transaction hash. In step 412, the generated new transaction value may be digitally signed by a signing module (e.g., the signing module 216) of the processing server. In step 414, the signed new transaction value may be electronically transmitted by a transmitting device (e.g., of the transmitting device 220) of the processing server.

In one embodiment, the new transaction value may be further based on a reference identifier associated with an executable script associated with the blockchain. In a further embodiment, the executable script may be configured to execute the modified data file and output a deterministic response. In some embodiments, generating the new transaction value may include hashing, by the hashing module of the processing server, at least the generated new hash value and the specific transaction hash. In one embodiment, the method 400 may include storing, in a database (e.g., the memory 206) of the processing server, a plurality of key-value pairs, wherein the plurality of key-value pairs includes at least a first comprising the specific transaction hash as a key and the received data file as a value; and executing, by a querying module (e.g., the querying module 208) of the processing server, a query on the database to insert a new key-value pair comprising the generated new hash value as a key and the modified data file as a value.

Figure 5:
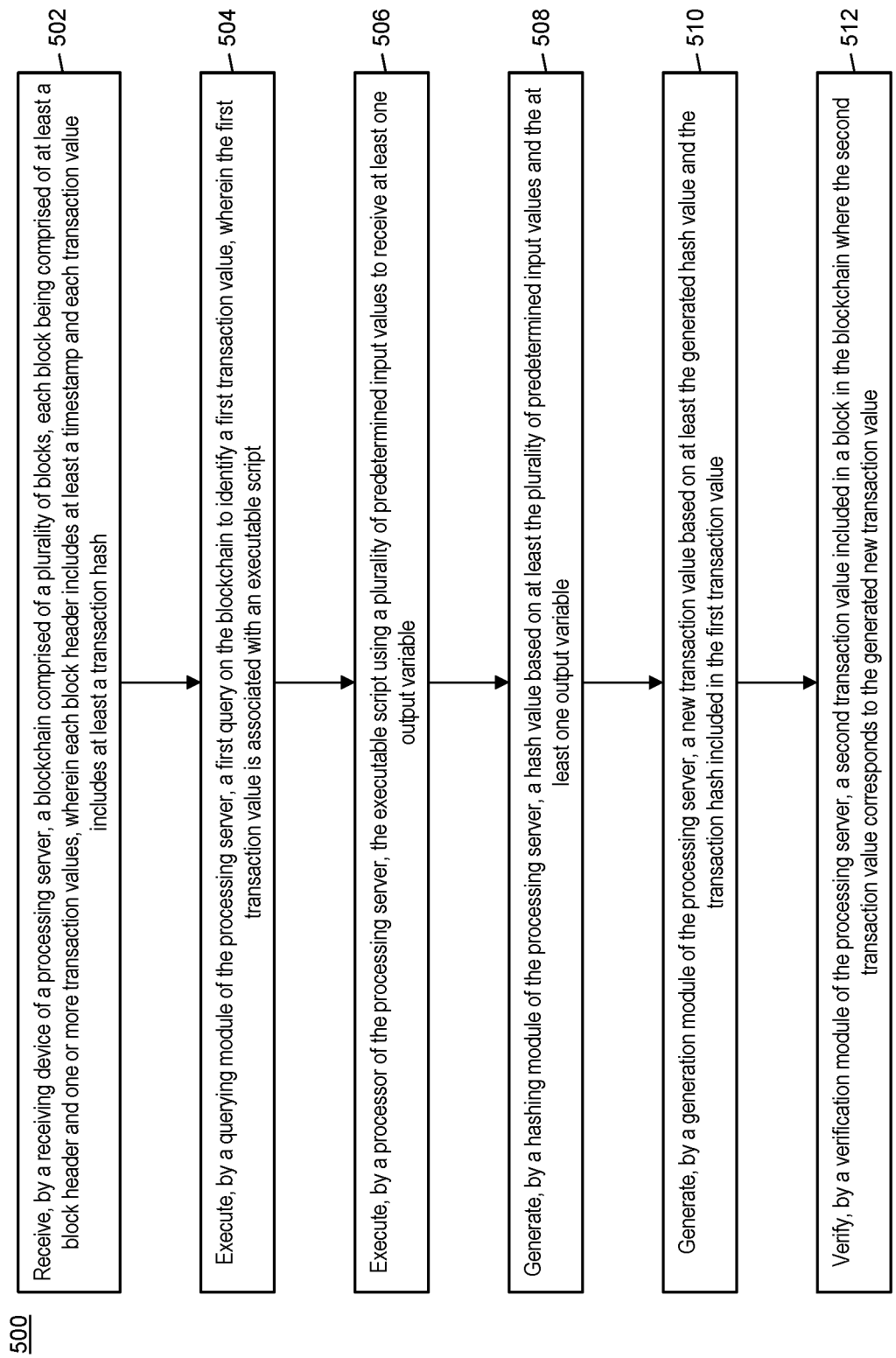
FIG. 5 is a flow chart illustrating an exemplary method for auditing and verification of deterministic data posted to a blockchain in accordance with exemplary embodiments.

Exemplary Method for Auditing and Verification of Deterministic Data Posted to a Blockchain FIG. 5 illustrates a method 500 for the auditing and verification of data posted to a blockchain based on deterministic inputs.

In step 502, a blockchain comprised of a plurality of blocks may be received by a receiving device (e.g., the receiving device 202) of a processing server (e.g., the processing server 102) each block being comprised of at least a block header and one or more transaction values, wherein each block header includes at least a timestamp and each transaction value includes at least a transaction hash. In step 504, a first query may be executed by a querying module (e.g., the querying module 208) of the processing server on the blockchain to identify a first transaction value, wherein the first transaction value is associated with an executable script.

In step 506, the executable script may be executed by a processor of the processing server using a plurality of predetermined input values to receive at least one output variable. In step 508, a hash value may be generated by a hashing module (e.g., the hashing module 210) of the processing server based on at least the plurality of predetermined input values and the at least one output variable.

In step 510, a new transaction value may be generated by a generation module (e.g., the generation module 212) of the processing server based on at least the generated hash value and the transaction hash included in the first transaction value. In step 512, a second transaction value included in a block in the blockchain may be verified by a verification module (e.g., the verification module 218) of the processing server where the second transaction value corresponds to the generated new transaction value.

In one embodiment, verifying the second transaction value may comprise: executing, by the querying module of the processing server, a second query on the blockchain to identify the second transaction value; and verifying, by the verification module of the processing server, that the second transaction value is equivalent to the generated new transaction value. In some embodiments, generating the new transaction value includes hashing, by the hashing module of the processing server, at least the generated hash value and the transaction hash included in the first transaction value.

In one embodiment, verifying the second transaction value may comprise: executing, by the querying module of the processing server, a second query on the blockchain to identify the second transaction value; and verifying, by the verification module of the processing server, a digital signature used to digitally sign the included transaction hash. In a further embodiment, the method 500 may even further include storing, in a memory (e.g., the memory 206) of the processing server, a public key, wherein verification of the digital signature uses the stored public key.

Computer System Architecture

Figure 6:
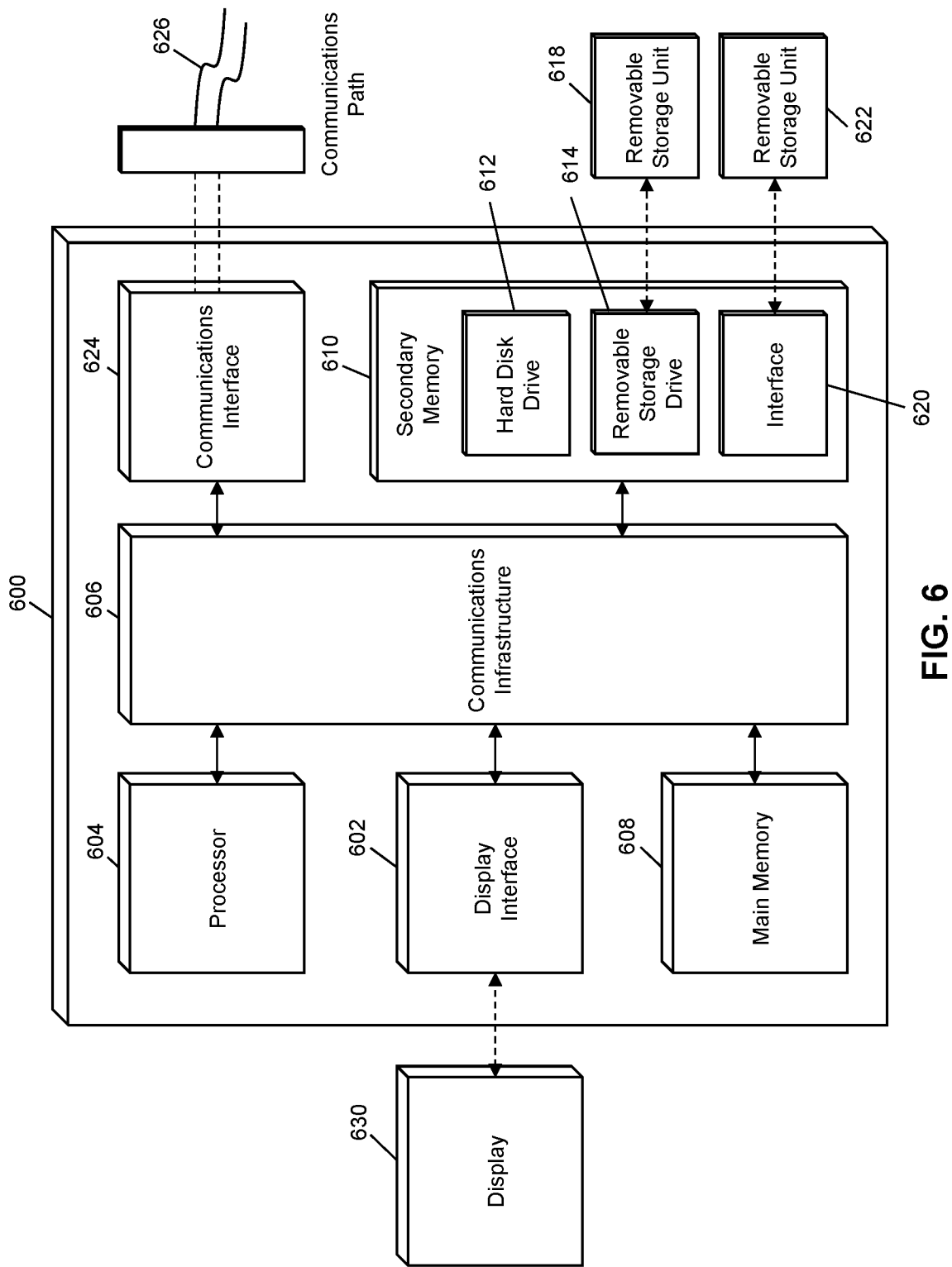
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for the posting and verification of auditable and immutable data on a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for posting of auditable, immutable data to a blockchain, comprising:
   receiving, by a receiving device of a processing server, a blockchain comprised of a plurality of blocks, wherein each block is comprised of one or more transaction values, wherein each transaction value includes at least a transaction hash;
   receiving, by the receiving device of the processing server, one or more deterministic transaction inputs associated with a specific transaction hash included in a block in the blockchain, where each of the one or more deterministic transaction inputs is associated with one or more predetermined conditions for deterministically satisfying the corresponding deterministic transaction input;
   modifying, by a processor device of the processing server, in response to satisfying one of the one or more predetermined conditions of at least one of the one or more deterministic transaction inputs, the corresponding at least one of the one or more deterministic transaction inputs, wherein said modification of said one or more deterministic transaction inputs includes at least one of changing a flag and supplementing of a reference a confirmation number;
   generating, by the processor device of the processing server, a new hash value via application of one or more hashing algorithms to the modified at least one of the one or more deterministic transaction inputs;
   generating, by the processor device of the processing server, a new transaction value based on at least the generated new hash value and a reference identifier associated with an executable script associated with the blockchain, wherein the new transaction value is based on the modified at least one of the one or more deterministic transaction inputs, wherein execution of the executable script outputs a deterministic response for verifying whether the one of the one or more predetermined conditions of the at least one of the one or more deterministic transaction inputs is satisfied;
   digitally signing, by the processor device of the processing server, the generated new transaction value; and
   electronically transmitting, by a transmitting device of the processing server, the signed new transaction value.

2. The method of claim 1, wherein the reference identifier is a hash of the executable script.

3. The method of claim 1, wherein the executable script is a smart contract.

4. The method of claim 1, wherein the execution of the executable script verifies that the one of the one or more predetermined conditions is unsatisfied.

5. The method of claim 4, wherein responsive to the unsatisfaction of the one of the one or more predetermined conditions, the execution of the executable script generates an indication of the unsatisfaction of the one or more predetermined conditions.

6. The method of claim 5, wherein the indication of the unsatisfaction of the one or more predetermined conditions comprises an indication of non-payment or a payment refund.

7. A method for auditing and verification of deterministic data posted to a blockchain, comprising:
receiving, by a receiving device of a processing server, a blockchain comprised of a plurality of blocks, wherein each block is comprised of one or more transaction values, wherein each transaction value includes at least a transaction hash;
executing, by a processor device of the processing server, a first query on the blockchain to identify a first transaction value, wherein the first transaction value is associated with an executable script;
executing, by the processor device of the processing server, the executable script using a plurality of predetermined input conditions for deterministically satisfying one or more deterministic transaction inputs associated with (i) a specific transaction hash included in a block in the blockchain and (ii) the first transaction value to receive at least one deterministic response;
generating, by the processor device of the processing server, a hash value based on at least the plurality of predetermined input conditions and the at least one deterministic response;
generating, by the processor device of the processing server, a new transaction value based on at least the generated hash value and the transaction hash included in the first transaction value; and
verifying, by the processor device of the processing server, whether a second transaction value included in a block in the blockchain matches the generated new transaction value, wherein the second transaction value is based on at least a modified one of the one or more deterministic transaction inputs that is modified based on whether one or more associated predetermined input conditions is satisfied, wherein modification of said one or more deterministic transaction inputs includes at least one of changing a flag and supplementing of a reference or confirmation number.

8. The method of claim 7, wherein verifying whether the second transaction value matches the generated new transaction value comprises:
executing, by the processor device of the processing server, a second query on the blockchain to identify the second transaction value; and
verifying, by the processor device of the processing server, that the second transaction value is equivalent to the generated new transaction value.

9. The method of claim 7, wherein verifying whether the second transaction value matches the generated new transaction value comprises:
executing, by the processor device of the processing server, a second query on the blockchain to identify the second transaction value; and
verifying, by the processor device of the processing server, that the second transaction value is different from the generated new transaction value.

10. The method of claim 7, wherein the executable script is a smart contract.

11. A system for posting of auditable, immutable data to a blockchain, comprising:
a receiving device of a processing server configured to receive:
a blockchain comprised of a plurality of blocks, wherein each block is comprised of one or more transaction values, wherein each transaction value includes at least a transaction hash, and
one or more deterministic transaction inputs associated with a specific transaction hash included in a block in the blockchain, where each of the one or more deterministic transaction inputs is associated with one or more predetermined conditions for deterministically satisfying the corresponding deterministic transaction input;
a processor device of the processing server configured to modify, based on whether one of the one or more predetermined conditions of at least one of the one or more deterministic transaction inputs is satisfied, the corresponding at least one of the one or more deterministic transaction inputs, wherein said modifying said one or more deterministic transaction inputs includes at least one of changing a flag and supplementing of a reference or confirmation number;
generate a new hash value via application of one or more hashing algorithms to the modified at least one of the one or more deterministic transaction inputs;
generate a new transaction value based on at least the generated new hash value and a reference identifier associated with an executable script associated with the blockchain, wherein the new transaction value is based on the modified at least one of the one or more deterministic transaction inputs, wherein execution of the executable outputs a deterministic response for verifying whether the one of the one or more predetermined conditions of the at least one of the one or more deterministic transaction inputs is satisfied;
digitally sign the generated new transaction value; and
a transmitting device of the processing server configured to electronically transmit the signed new transaction value.

12. The system of claim 11, wherein the reference identifier is a hash of the executable script.

13. The system of claim 11, wherein the executable script is a smart contract.

14. The system of claim 11, wherein the execution of the executable script verifies that the one of the one or more predetermined conditions is unsatisfied.

15. The system of claim 14, wherein responsive to the unsatisfaction of the one of the one or more predetermined conditions, the execution of the executable script is configured to generate an indication of the unsatisfaction of the one or more predetermined conditions.

16. The system of claim 15, wherein the indication of the unsatisfaction of the one or more predetermined conditions comprises an indication of non-payment or a payment refund.

17. A system for auditing and verification of deterministic data posted to a blockchain, comprising:
a receiving device of a processing server configured to receive a blockchain comprised of a plurality of blocks, wherein each block is comprised of one or more transaction values, wherein each transaction value includes at least a transaction hash;
a processor device of the processing server configured to execute a first query on the blockchain to identify a first transaction value, wherein the first transaction value is associated with an executable script;

execute the executable script using a plurality of predetermined input conditions for deterministically satisfying one or more deterministic transaction inputs associated with (i) a specific transaction hash included in a block in the blockchain and (ii) the first transaction value to receive at least one deterministic response;

generate a hash value based on at least the plurality of predetermined input conditions and the at least one deterministic response;

generate a new transaction value based on at least the generated hash value and the transaction hash included in the first transaction value; and verify whether a second transaction value included in a block in the blockchain matches the generated new transaction value, wherein the second transaction value is based on at least a modified one of the one or more deterministic transaction inputs that is modified based on whether one or more associated predetermined input conditions is satisfied, wherein modification of said one or more deterministic transaction inputs includes at least one of changing a flag and supplementing of a reference or confirmation number.

18. The system of claim 17, wherein in verifying whether the second transaction value matches the generated new transaction value, the processor device (i) executes a second query on the blockchain to identify the second transaction value; and (ii) verifies that the second transaction value is equivalent to the generated new transaction value.

19. The system of claim 17, wherein in verifying whether the second transaction value matches the generated new transaction value, the processor device (i) executes a second query on the blockchain to identify the second transaction value; and (ii) verifies that the second transaction value is different from the generated new transaction value.

20. The system of claim 17, wherein the executable script is a smart contract.

* * * * *